(12) United States Patent
Nakai et al.

(10) Patent No.: US 7,357,969 B2
(45) Date of Patent: Apr. 15, 2008

(54) PHASE-CHANGE OPTICAL RECORDING MEDIUM

(75) Inventors: Tsukasa Nakai, Hino (JP); Sumio Ashida, Yokohama (JP); Keiichiro Yusu, Yokohama (JP); Takayuki Tsukamoto, Kawasaki (JP); Noritake Oomachi, Yokohama (JP); Naomasa Nakamura, Yokohama (JP); Katsutaro Ichihara, deceased, late of Yokohama (JP); by Urara Ichihara, legal representative, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/976,367

(22) Filed: Oct. 29, 2004

(65) Prior Publication Data

US 2005/0106353 A1    May 19, 2005

(30) Foreign Application Priority Data

Oct. 30, 2003    (JP)    ............................. 2003-370921

(51) Int. Cl.
*B32B 3/02*    (2006.01)

(52) U.S. Cl. ................... 428/64.1; 428/64.4; 428/64.5; 428/64.6; 430/270.13

(58) Field of Classification Search ................ 428/64.5, 428/64.6; 430/270.13
See application file for complete search history.

(56) References Cited

U.S. PATENT DOCUMENTS

| | | | |
|---|---|---|---|
| 6,042,921 A * | 3/2000 | Yoshinari et al. .......... | 428/64.1 |
| 6,153,063 A * | 11/2000 | Yamada et al. ........ | 204/192.22 |
| 6,312,780 B1 * | 11/2001 | Kasami et al. ............. | 428/64.1 |
| 6,514,591 B1 | 2/2003 | Nagata et al. | |
| 6,551,679 B1 * | 4/2003 | Kuroda et al. ............. | 428/64.1 |
| 2001/0023006 A1 * | 9/2001 | Miyamoto et al. ......... | 428/64.1 |
| 2003/0161257 A1 | 8/2003 | Yusu et al. | |
| 2004/0013069 A1 * | 1/2004 | Uno et al. ............... | 369/59.11 |
| 2004/0076908 A1 | 4/2004 | Oomachi et al. | |

(Continued)

FOREIGN PATENT DOCUMENTS

JP    11-3538    1/1999

(Continued)

OTHER PUBLICATIONS

Sumio Ashida et al., "Fast deposition of the dielectric film for the rewritable HD DVD," Proceedings of the 15th Symposium on Phase-Change Optical Information Storage, PCOS 2003, Oct. 30-31, 2003, pp. 62-66.

(Continued)

*Primary Examiner*—Bruce H. Hess
(74) *Attorney, Agent, or Firm*—Pillsbury Winthrop Shaw Pittman, LLP

(57) ABSTRACT

A phase-change optical recording medium has a first information layer including a phase-change optical recording film arranged in a position close to the light incident side, a second information layer including another phase-change optical recording film arranged in a position remote from the light incident side and an interlayer separating film arranged between the first information layer and the second information layer, in which at least one of the first information layer and the second information layer includes a noise reduction film in contact with the interlayer separating film. The noise reduction film is formed of SiOx ($1 \leq x \leq 2$) or SiOC.

9 Claims, 1 Drawing Sheet

Laser beam

U.S. PATENT DOCUMENTS

2005/0025035 A1* 2/2005 Nakai et al. .............. 369/275.2

FOREIGN PATENT DOCUMENTS

| JP | 11-213446 | 8/1999 |
|----|-----------|--------|
| JP | 2000-215516 | 8/2000 |
| JP | 2000-322770 | 11/2000 |
| JP | 2001-232941 | 8/2001 |
| JP | 2002-074742 | 3/2002 |
| JP | 2002-269823 | 9/2002 |
| JP | 2002-298430 | 10/2002 |
| JP | 2003-016687 | 1/2003 |

OTHER PUBLICATIONS

Rie Kojima et al., "Ge-Sn-Sb-Te Phase-Change Recording Material Having High Crystallization Speed," Proceedings of the 12$^{th}$ Symposium of Phase-Change Optical Information Storage, PCOS 2000, Nov. 30-Dec. 1, 2000, pp. 36-41.

Japanese Office Action dated Sep. 12, 2006 for Appln. No. 2003-370921.

* cited by examiner

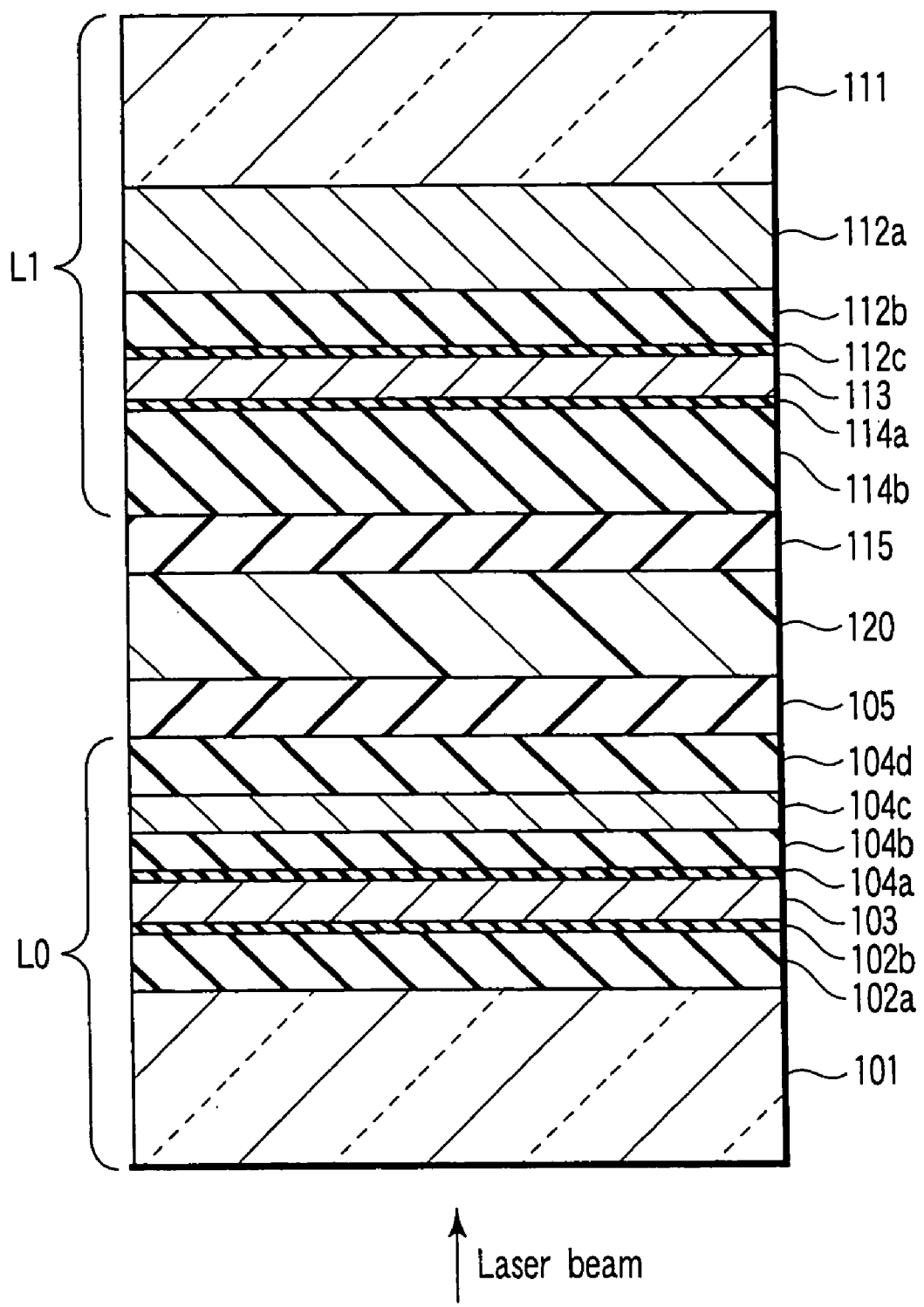
FIGURE

PHASE-CHANGE OPTICAL RECORDING MEDIUM

CROSS-REFERENCE TO RELATED APPLICATIONS

This application is based upon and claims the benefit of priority from prior Japanese Patent Application No. 2003-370921, filed Oct. 30, 2003, the entire contents of which are incorporated herein by reference.

BACKGROUND OF THE INVENTION

1. Field of the Invention

The present invention relates to a phase-change optical recording medium in which atomic arrangement of the recording film is changed between amorphous and crystalline states upon irradiation with a light beam.

2. Description of the Related Art (Principle of Phase-change Optical Recording Medium)

In recent years, a rapid propagation is being achieved in the optical recording medium, particularly, in the phase-change optical recording medium in which atomic arrangement of the recording film is changed between amorphous and crystalline states upon irradiation with a light beam. In the phase-change optical recording medium, data writing, reading and erasure are carried out according to the following principle. The writing is carried out by utilizing the phenomenon that the phase-change optical recording film generally assumes amorphous atomic arrangement when a portion thereof is heated to a temperature higher than the melting point and molten and then rapidly cooled. Since intensity of reflected light from the amorphous portion of the film differs from intensity of reflected light from the crystalline portion, the intensity of the reflected light is converted into intensity of an electrical signal and, then, the electrical signal is subjected analog-to-digital conversion so as to make it possible to read out the information (reading). Further, if the phase-change optical recording film is maintained for a prescribed time or longer in a temperature range lower than the melting point and higher the crystallizing temperature, the crystalline state of the film is maintained in the case where the recording film is crystalline, but the recording film is crystallized where the recording film is amorphous. Therefore, it is possible to bring the state of the phase-change optical recording film back to the initial crystalline state (erasure).

It should noted that the writing and reading can be performed by utilizing phase-change between a metastable crystalline phase and a stable crystalline phase as in martensite or phase-change among metastable crystalline phases as well as the phase-change between the crystalline phase and the amorphous phase noted above.

(Means for Increasing Recording Density)

The amount of information that can be recorded in a single recording medium, i.e., the recording capacity, can be increased by the two methods described below.

A first method is to shorten the pitch between the recording marks in the circumferential direction of the track, i.e., to shorten the bit pitch. In this method, however, if the pitch between the recording marks is significantly reduced, a difficulty that two recording marks are included temporarily in the read beam spot may be caused. Specifically, it is possible for. Where the recording marks are sufficiently separated from each other, the read signal is highly modulated so as to make it possible to obtain a signal having high amplitude. However, where the recording marks are close to each other, the obtained signal has low amplitude, with the result that errors tend to occur in the stage of converting the obtained signal into digital data.

Another method for improving the recording density is to reduce an interval in the radial direction of the tracks, i.e., to shorten the so-called "track pitch". This method makes it possible to increase the recording density without being affected significantly by decrease in the signal intensity that is caused by the mark pitch reduction noted above. In this method, however, a so-called cross-erase problem is generated. Specifically, if the track pitch is made substantially equal to or smaller than a light beam size, the information in a certain track deteriorates when writing or erasure is performed on the adjacent track. The cross-erase problem is generated partly because the marks on a certain track are irradiated directly with the edge of the laser beam on the adjacent track, and partly because heat generated in writing the adjacent track flows into the track in question so as to raise the temperature of the marks on the track in question and, thus, to deform the marks. In order to increase the recording density of the phase-change optical recording medium, it is necessary to overcome the problems pointed out above. Also, in order to suppress the probability of read errors for small recording marks to a low level, it is desirable that the recording marks be formed in a manner to have an even contour so as to suppress noise components as much as possible.

(Increase in Recording Capacity by using Multi-layer Disc)

Another method for increasing the recording capacity is to stack a plurality of layers for carrying information, which is formed of a multi-layered film including a recording film and referred to as an information layer hereinafter (see Japanese Patent Disclosure (Kokai) No. 2000-322770). The recording medium that is designed such that two information layers are stacked one upon the other and the information is written to and read from one side is called a single-sided, dual-layer disc or is simply called a dual-layer disc. It is possible to stack two single-sided, dual-layer discs so as to form a double-sided, quadruple-layer disc for further increasing the recording capacity. Of the stacked two information layers, the information layer positioned close to the light incident side is called L0, and the information layer positioned remote from the light incident side is called L1. In the single-sided, dual-layer disc, it is necessary that the transmittance of the L0 information layer positioned close to the light incident side is at least about 50% to prevent the light from being attenuated excessively in the information layer L0 close to the light incident side in accessing to the information layer remote from the light incident side. Such being the case, it is necessary for the phase-change optical recording film included in the L0 information layer to be very thin, i.e., about 5 to 7 nm. In the case of such a thin recording film, the retention time required for the crystallization is prolonged, with the result that the recording mark fails to be erased completely at the normal recording speed. The particular situation will be described herein later in detail. As a measure against the difficulty, it is known that it is effective to substitute Sn for a part of the GeSbTe recording film (see Proceedings of The 12th Symposium on Phase-Change Optical Information Storage. PCOS 2000, pp. 36–41). Also, it is known that it is effective to substitute Bi, In, Sn and Pb for a part of the GeSbTe recording film (see Japanese Patent Disclosure No. 2001-232941). In contrast, it is necessary that the writing and erasure must be performed in the L1 information layer by the laser light the intensity of which has been substantially halved by the L0 information layer and, thus, which requires increase in the sensitivity of the L1 information layer.

(Manufacturing Process of Single-Sided, Dual-Layer Disc)

The manufacturing process of the single-sided, dual-layer disc can be classified into two procedures given below depending on the stage at which the initialization is performed. The term "initialization" denotes the process of irradiating an amorphous recording film immediately after deposition with an initializing beam having a relatively large width, the initializing beam having a wavelength greater than that of the write beam and intensity lower than that of the write beam, so as to crystallize the recording film. In this case, the initialization is performed over the entire region of the disc while rotating the disc and moving the initializing beam in the radial direction of the disc.

(1) A method in which two polycarbonate (PC) substrates are prepared, and a multi-layered film constituting the information layer for each of these two PC substrates is deposited, followed by initializing the recording film included in each of the information layer. Then, the two PC substrates are adhered to each other. In this method, the initialization is performed in the state that the deposited multi-layered film is exposed to the outside for each of the L0 information layer and the L1 information layer.

(2) A method in which two PC substrates are prepared, and a multi-layered film constituting: the information layer for each of these two PC substrates is deposited, followed by initializing the L1 information layer alone, and then, the L0 information layer and the L1 information layer are adhered to each other, followed by initializing the L0 information layer. In this method, the L1 information layer is initialized in the state that the deposited multi-layered film is exposed to the outside, while the L0 information layer is initialized in the state that the multi-layered film is sandwiched between the two PC substrates and, thus, is not exposed to the outside.

In the high-density optical recording medium having a reduced track pitch, it is possible that the final disc characteristics may be degraded by the initializing process, making it necessary to pay careful attentions. The above problem is caused by the following reason. That is, the films and the substrate constituting the recording medium are thermally expanded by the initializing beam. However, where the track pitch is made very small and thus the number of tracks including the lands and the grooves is increased relative to the diameter of the initializing beam, it is difficult to make the crystalline state of the recording film for each track uniform while making uniform the influences given by the thermal expansion.

The reason why at least one information layer is initialized before the L0 and L1 information layers are adhered to each other as in procedure (1) or (2) given above is because discs subjected to defective initialization, if produced, are to be removed before the adhesion stage so as to improve the yield. In the single-sided, dual-layer phase-change optical recording medium, a interlayer separating film having a thickness of about 20 to 30 µm is formed between the L0 information layer positioned close to the light incident side and the L1 information layer positioned remotely from the light incident side. In general, the interlayer separating film noted above is formed by the process including the steps of spin-coating the multi-layered film included in one of the two information layers with ultraviolet (UV) curing, adhering the multi-layered film of the other information layer so as to face the above multi-layered film, followed by irradiating the adhered structure with ultraviolet light so as to cure the resin. The interlayer separating film is required to exhibit thickness uniformity that the distribution of the thickness is not larger than ±1 µm. In order to satisfy the condition noted above, it is necessary to coat a disc having a large area of, for example, 120 mm diameter with a UV-curing resin having a reasonable fluidity, followed by uniformly irradiating the resin with an ultraviolet light so as to cure instantly the resin with a high uniformity.

In the process of reading the signal from one information layer included in the single-sided, dual-layer disc, it is possible for the reflected light or the scattered light from the other information layer to be contained in the read signal, which may raise a noise level. In some cases, it is difficult to discriminate the noise by the measurement of the carrier-to-noise ratio (CNR) alone. The noise due to the above reason is found by measurement of bit error rate (bER) and the detailed study with respect to relationship between the noise components contained in the read signal and the tracking signal and the noise level.

(Means for High-Speed Recording)

High-speed recording is also required for the phase-change optical recording medium. For example, if the writing can be performed in a time shorter than the actual viewing time, it is possible to easily realize the so-called "time-shift function" that the previous images can be viewed in the copying stage of the distributed recording medium or during the real-time recording of the broadcasting images. However, one of the factors for inhibiting the high-speed recording in the phase-change optical recording medium is a problem that the information fails to be erased completely when crystallization is performed in the overwriting stage by a laser beam at a relatively low erasure level, i.e., the problem of the insufficient erasure rate. To be more specific, since a recording mark passes through the laser spot at a high speed, it is difficult to retain the recording mark for a sufficiently long time in temperature range within which the crystallization can be performed, with the result that the information fails to be erased completely. In order to ensure a satisfactory erasing operation, the uniformity of the formed recording marks and the recording film itself is rendered more important. In order to enhance the uniformity in the shape of the recording marks, the uniformity in the initialized state, i.e., in the crystalline state is required.

(Film Design of Phase-Change Optical Recording Medium)

As described previously under the item of the principle of the phase-change optical recording medium, the information is written in the phase-change optical recording medium by irradiating a desired portion of the recording film with a laser beam, followed by rapidly cooling the irradiated portion so as to form an amorphous mark, and the written information is erased by irradiating the amorphous mark with a laser beam, followed by gradually cooling the irradiated portion so as to crystallize the irradiated portion. It follows that the writing and erasure can be performed with a lower laser power when the absorbance in the recording film is high. In contrast, a higher laser power is required for the writing and erasure when the absorbance in the recording film is low.

It should be noted that the laser beam absorbance in the recording film is determined by the optical characteristics of the information film formed of a multi-layered film. What is also important is the thermal design relating to the film structure as to, for example, whether a rapid cooling structure is employed, even if the absorbance is the same. Thus, in the film design of the phase-change optical recording medium, the optical design and the thermal design are mainly taken into consideration. For the optical design, the optical characteristics of each thin film are required. Also, for the thermal design, the thermal properties including the melting point of each thin film, the latent heat of melting, and the crystallization temperature are required.

As described above, in the single-sided, dual-layer disc, it is necessary for the recording film included in the L0 information layer to be very thin, e.g., about 5 to 7 nm, and for the recording film included in the L1 information layer not to be unduly thick, e.g., about 10 nm. In the particular film construction, the damage suffered by the recording film in the initializing stage has been increased, leading is to the requirement of the film design in view of the entire process.

BRIEF SUMMARY OF THE INVENTION

A phase-change optical recording medium according to an aspect of the present invention comprises: a first information layer including a phase-change optical recording film arranged in a position close to a light incident side; a second information layer including another phase-change optical recording film arranged in a position remote from the light incident side; and an interlayer separating film arranged between the first information layer and the second information layer, at least one of the first information layer and the second information layer comprising a noise reduction film in contact with the interlayer separating film, and the noise reduction film comprising at least one material selected from the group consisting of $SiO_x$ ($1 \leq x \leq 2$), SiOC, $MgO_x$ ($1 \leq x \leq 2$), $Al_2O_3$, Si—Al—O (mullite), $Yb_2O_3$, $Si_3N_4$, $BaF_2$, $BiF_3$, $CeF_3$, $LaF_3$, $NdF_3$, $PbF_2$, $DyF_2$, $GdF_3$, $HOF_3$, $NdF_3$, $SrF_2$, $ThF_4$, $YbF_3$, $YF_3$, $AlF_3$, $CaF_2$, $MgF_2$, NaF, $Na_3AlF_6$, $Na_5Al_3F_{14}$, LiF, $ThO_2$, $La_2O_3$, $Gd_2O_3$, $Bi_2O_3$, $HfO_2$, $Nd_2O_3$, $Sb_2O_3$, $Sc_2O_3$, $V_2O_5$, $Y_2O_3$, AlN, $CeO_2$, $Ho_2O_3$, $In_2O_3$, $SnO_2$, $Pr_6O_{11}$ and ZnO.

BRIEF DESCRIPTION OF THE SEVERAL VIEWS OF THE DRAWING

The single FIGURE is a cross-sectional view showing the optical recording medium according to one embodiment of the present invention.

DETAILED DESCRIPTION OF THE INVENTION

The phase-change optical recording medium according to the embodiment of the present invention is typically a single-sided, dual-layer disc prepared by adhering a first information layer (L0 information layer) arranged in a position close to the light incident side and a second information layer (L1 information layer) arranged in a position remote from the light incident side to each other, with an interlayer separating film (UV-curing resin film) interposed therebetween. The present invention also includes a double-sided, quadruple-layer disc prepared by stacking two single-sided, dual-layer discs. In the following description, the phase-change optical recording medium of the present invention is represented by a single-sided, dual-layer disc.

The L0 information layer (first information layer) comprises a dielectric film, a phase-change optical recording film, another dielectric film, a reflective film and, as required, a noise reduction film, which are stacked in the order mentioned on a transparent substrate (first substrate). The transparent substrate is arranged on the light incident side. The L1 information layer (second information layer) comprises a reflective film, a dielectric film, a phase-change optical recording film, another dielectric film, and, as required, a noise reduction film, which are stacked in the order mentioned on a transparent substrate (second substrate). The second transparent substrate is arranged on the side remote from the light incident side. At least one of the L0 information layer and the L1 information layer comprises the noise reduction film that is in contact with the separating film, and it is desirable that both of the L0 information layer and the L1 information layer include the noise reduction film. The constituent members of each information layer will now be described.

A disc substrate made of a transparent resin represented by polycarbonate (PC) is used as each of the first and second substrates included in the L0 information layer and the L1 information layer, respectively. Each of the first and second substrates is formed by injection molding and has a groove on the surface so as to be adapted for the land/groove recording.

The phase-change optical recording film included in each of the L0 information layer and the L1 information layer is formed of a material represented by, for example, GeSbTe. In particular, it is desirable to use a GeSbTe phase-change optical recording film having a composition close to a so-called "pseudo-binary system", which can be represented by $(GeTe)_a(Sb_2Te_3)_b$. To be more specific, it is desirable that the phase-change optical recording film is formed of a material represented by the general formula given below:

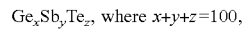
$Ge_xSb_yTe_z$, where $x+y+z=100$, wherein the recording film has a composition within a range defined by x=55, z=45; x=45, z=55; x=10, y=28, z=42; and x=10, y=36, z=54 on the ternary phase diagram of GeSbTe.

It is also possible to use a material having a composition in which Bi and/or Sn is substituted for a part of GeSbTe of the above composition range and represented by the general formula five below:

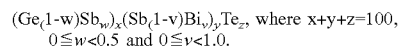
$(Ge_{(1-w)}Sb_w)_x(Sb_{(1-v)}Bi_v)_yTe_z$, where $x+y+z=100$,
$0 \leq w < 0.5$ and $0 \leq v < 1.0$.

If the substituting ratio w of Sn for Ge is 0.5 or more, the crystallizing rate is excessively high so as to make prominent the recrystallization after melting, resulting in failure to form stable amorphous marks. Further, it is possible to use a material prepared by adding materials such as Co, V and Ag, other than Sn and Bi, to GeSbTe.

It is also desirable to use for the phase-change optical recording film a material by the general formula given below:

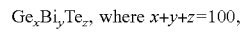
$Ge_xBi_yTe_z$, where $x+y+z=100$, wherein the recording film has a composition within a range defined by x=55, z=45; x=45, z=55; x=10, y=28, z=42; and x=10, y=36, z=54 on the ternary phase diagram of GeBiTe.

The other films constituting each of the information layers include, for example, a dielectric film, an interface film, a reflective film and a protective film.

The dielectric film, which is also called an interference film, is generally arranged on the upper and lower sides of the phase-change optical recording film, and mainly performs a function of controlling optical characteristics of the information layer. The dielectric film is formed of, for example, $ZnS:SiO_2$, AlN, $Al_2O_3$, $SiO_2$, SiO, Si—O—N, Si—N, Al—O—N, Si—C, $TiO_2$, Ta—N, $Ta_2O_5$, Ta—O—N, Zn—O, ZnS, $ZrO_2$, Zr—O—N, Zr—N, Cr—O, Mo—O, W—O, V—O, Nb—O, Ta—O, In—O, Cu—O, Sn—O and In—Sn—O.

The interface film is formed in contact with the phase-change optical recording film and performs a function of promoting the crystallization of the recording film. It is possible to use, for example, $HfO_2$, GeN, Si—C or Si—N for the interface film.

The reflective film performs a function of bringing partly the light transmitted through the phase-change optical recording film back to the recording film and also performs a function of enhancing a heat radiating property. It is possible to use, for example, an Ag alloy or an Al alloy for the reflective film.

The protective film is formed in contact with the reflective film. It is possible to use, for example, $ZnS:SiO_2$ for the protective film.

In the L0 information layer, it is possible for the dielectric film and the interface film to be formed on the light incident side relative to the phase-change optical recording film. Alternatively, it is possible for the dielectric film alone or the interface film alone to be formed on the light incident side relative to the phase-change optical recording film.

In the L0 information layer, it is possible for four layers of the interface film, the dielectric film, the reflective film and the protective film to be formed in the position remote from the light incident side relative to the phase-change optical recording film. Alternatively, it is possible for two layers of the dielectric film and the reflective film, two layers of the interface film and the reflective film, three layers of the interface film, the dielectric film and the reflective film, three layers of the dielectric film, the reflective film and an additional dielectric film or three layers of the interface film, the reflective film and the dielectric film to be formed in the position remote from the light incident side relative to the phase-change optical recording film.

In the L1 information layer, it is possible for two layers consisting of the dielectric film and the interface film to be formed on the light incident side relative to the phase-change optical recording film. Alternatively, it is possible for the dielectric film alone, the interface film alone, or a stacked dielectric film and the interface film to be formed on the light incident side relative to the phase-change optical recording film.

In the L1 information layer, it is possible for three layers of the interface film, the dielectric film and the reflective film to be formed in the position remote from the light incident side relative to the phase-change optical recording film. Alternatively, it is possible for two layers of the dielectric film and the reflective film or two layers of the interface film and the reflective film to be formed in the position remote from the light incident side relative to the phase-change optical recording film.

Further, it is possible for the dielectric film to be of a stacked structure consisting of a plurality of dielectric films formed of different materials. For example, it is possible to form an additional dielectric film between the dielectric film and the reflective film. Also, it is possible for the reflective film to be formed of a plurality of films or the reflective film may not be formed.

The noise reduction film is formed of a material comprising at least one material selected from the group consisting of $SiO_x$ ($1 \leq x < 2$), SiOC, $MgO_x$ ($1 \leq x \leq 2$), $Al_2O_3$, Si—Al—O (mullite), $Yb_2O_3$, $Si_3N_4$, $BaF_2$, $BiF_3$, $CeF_3$, $LaF_3$, $NdF_3$, $PbF_2$, $DyF_2$, $GdF_3$, $HoF_3$, $NdF_3$, $SrF_2$, $ThF_4$, $YbF_3$, $YF_3$, $AlF_3$, $CaF_2$, $MgF_2$, NaF, $Na_3AlF_6$, $Na_5Al_3F_{14}$, LiF, $ThO_2$, $La_2O_3$, $Gd_2O_3$, $Bi_2O_3$, $HfO_2$, $Nd_2O_3$, $Sb_2O_3$, $SC_2O_3$, $V_2O_5$, $Y_2O_3$, AlN, $CeO_2$, $Ho_2O_3$, $In_2O_3$, $SnO_2$, $Pr_6O_{11}$, and ZnO.

The function and the effect of the noise reduction film in the phase-change optical recording medium according to the embodiments of the present invention will now be described.

In the initializing process in the manufacturing method of the phase-change optical recording medium of the present invention, the noise reduction film performs a function of uniformly proceeding crystallization of the phase-change optical recording film without giving damage in the medium plane so as to achieve uniform initialization. Thus, the noise reduction film can also be called an initialization assisting film. To be more specific, when the multi-layered film constituting each of the information layers is irradiated with an initializing laser beam in the state that the multi-layered film is exposed to the outside, the noise reduction film serves to form a heat balance in the multi-layered film adapted for uniformly proceeding the initialization, serves to mechanically protect the multi-layered film, and, from an optical viewpoint, serves to moderate the rapid change in the reflected light before and after the initialization. Also, if the noise reduction film is formed, it is possible to obtain a function of moderating stress applied to the recording film in the process of adhering the L0 and L1 with an interlayer separating film (UV-curing resin film) and curing the resin. Since the noise reduction film permits improving the uniformity of the films constituting the information layer, the noise reduction film contributes to the improvement in sensitivity, to noise reduction, and to improvement in quality of signal characteristics.

Also, the noise reduction film serves to moderate the leakage of the reflected light or the scattered light from the other information layer in reading stage so as to lower the noise, thereby improving the quality of the signal characteristics. To be more specific, the noise reduction film permits suppressing the cross talk between the information layers, i.e., a so-called "interlayer cross talk (XT)", which is one of the serious problems that should be solved in the single-sided, dual-layer disc.

As described above, a noise reduction film is formed in the phase-change optical recording medium according to the embodiments of the present invention. What should be noted is that the noise reduction film makes it possible to achieve uniform initialization in the initializing process, to prevent or suppress the light leakage from the other information layer in the reading stage, and to lower the noise so as to improve the quality of the signal characteristics. As a result, it is possible to improve the recording density.

In the embodiments of the present invention, it is desirable for the noise reduction film to satisfy the conditions of $1.4 \leq n \leq 1.8$, $0 \leq k \leq 0.001$ and $20 \text{ nm} \leq d \leq 120 \text{ nm}$, where n and k are for n-ik representing the complex refractive index, and d [nm] denotes the thickness of the noise-reduction film.

If the complex refractive index of the noise reduction film fails to fall within the range given above, it is difficult to obtain the desired effects. It is more desirable for n and k in the complex refractive index n-ik of the noise reduction film to fall within a range of $1.45 \leq n \leq 1.75$ and $k \leq 0.001$. The particular noise reduction film can be said to have a refractive index close to that of the interlayer separating film. Incidentally, the materials of the noise reduction film enumerated above include ones which give a suitable complex refractive index noted above when they are used as a mixture of a plurality of materials.

If the thickness of the noise reduction film fails to fall within the range given above, it is difficult to obtain desired effects. In particular, it is undesirable for the thickness to exceed 120 nm because the light absorption in the noise reduction film is increased. It is more desirable for the thickness of the noise reduction film to fall within a range of between 30 nm and 90 nm.

It is desirable to use $SiO_x$ ($1 \leq x \leq 2$) or SiOC as the material of the noise reduction film exhibiting the optical characteristics noted above. The material SiOC contains silicon (Si), oxygen (O) and carbon (C) as main components and also contains inevitable impurities and traces of impurities. It is desirable for the carbon concentration in SiOC to be 20 atomic % or less.

The method given below can be employed for manufacturing the phase-change optical recording medium according to the embodiments of the present invention.

For example, it is possible to employ a method including steps of preparing the L0 information layer and the L1 information layer, initializing each of the L0 information layer and the L1 information layer, and adhering the L0 information layer and the L1 information layer to each other with an interlayer separating film.

It is also possible to employ a method including steps of preparing the L0 information layer and the L1 information layer, initializing the L1 information layer alone, adhering the L0 information layer and the L1 information layer to each other with an interlayer separating film, and further initializing the L0 information layer. Alternatively, it is also possible to employ a method including steps of preparing the L0 information layer and the L1 information layer, initializing the L0 information layer alone, adhering the L0 information layer and the L1 information layer to each other with an interlayer separating film, and further initializing the L1 information layer.

An example of the phase-change optical recording medium according to embodiments of the present invention will now be described with reference to FIGURE. The L0 information layer on the light incident side comprises a first substrate 101 and a stacked structure including a dielectric film 102a, an interface film 102b, a phase-change optical recording film 103, an interface film 104a, a dielectric film 104b, a reflective film 104c, a protective 104d and a noise reduction film 105, which are stacked in the order mentioned on the first substrate 101. The substrate 101 is arranged on the light incident side. The L1 information layer positioned remote from the light incident side comprises a second substrate 111 and a stacked structure including a reflective film 112a, a dielectric film 112b, an interface film 112c, a phase-change optical recording film 113, an interface film 114a, a dielectric film 114b, and a noise reduction film 115, which are stacked in the order mentioned on the second substrate 111. The second substrate 111 is arranged on the side remote from the light incident side. The noise reduction film 105 in the L0 information layer is positioned to face the noise reduction film 115 in the L1 information layer, and they are adhered to each other with an interlayer separating film 120 (UV-curing resin film). Incidentally, the construction of the phase-change optical recording medium according to embodiments of the present invention is not limited to the construction shown in FIGURE. It is possible to modify the construction of the phase-change optical recording medium in various fashions as described above.

Examples of the present invention will now be described.

EXAMPLE 1

A phase-change optical recording medium as shown in FIGURE was manufactured. The films included in the multi-layered film constituting each of the information layers were deposited in different deposition chambers, using the sputtering apparatus with multi process chambers. Since a vacuum transfer chamber is arranged between the deposition chambers, the substrate is kept under vacuum during deposition processes until the final deposition is completed.

Two polycarbonate (PC) substrates having a thickness of 0.59 mm formed by injection molding were used as the first substrate 101 and the second substrate 111. Grooves were formed on the surface of each of these substrates at a groove pitch of 0.68 μm, which corresponds to a track pitch of 0.34 μm in the case where information is recorded in both of the land (L) and groove (G).

Thin films given below were formed using the sputtering apparatus noted above on that surface of each of the first substrate 101 and the second substrate 111 on which the grooves were formed:

[L0 Information Layer]

Dielectric film 102a: $ZnS:SiO_2$
Interface film 102b: $HfO_2$
Phase-change optical recording film 103: GeSbTeBi
Interface film 104a: $HfO_2$
Dielectric film 104b: $ZnS:SiO_2$
Reflective film 104c: Ag alloy
Protective film 104d: $ZnS:SiO_2$
Noise reduction film 105: SiOC, 60 nm

[L1 Information Layer]

Reflective film 112a: Ag alloy
Dielectric film 112b: $ZnS:SiO_2$
Interface film 112c: $HfO_2$
Phase-change optical recording film 103: GeSbTeBi
Interface film 114a: $HfO_2$
Dielectric film 114b: $ZnS:SiO_2$
Noise reduction film 115: $SiO_2$, 90 nm For preparing the $ZnS:SiO_2$ film, a target prepared by mixing 80 atomic % of ZnS with 20 atomic % of $SiO_2$ was used. The concentration of carbon (C) in SiOC was 10 atomic %. As a result of various experiments, it has been found that a suitable concentration of carbon (C) in SiOC is 20 atomic % or less.

In the next step, the recording film was crystallized over the entire surface of each of the information layers using an initializing apparatus. After the initialization, the information layers were adhered with a UV-curing resin such that the deposition surfaces of the information layers face to each other. Then, the structure was irradiated with ultraviolet light so as to form an interlayer separating film 120, thereby obtaining a single-sided, dual-layer disc.

The resultant single-sided, dual-layer disc was evaluated using a disc evaluating apparatus DDU-1000 manufactured by Pulstec Industrial Co., Ltd. The disc evaluating apparatus was provided with a blue violet semiconductor laser having a wavelength of 405 nm and with an objective lens having numerical aperture (NA) of 0.65. The recording experiment was conducted by the land-groove recording scheme. The four items given below were evaluated.

(1) Measurement of bit error rate (bER):

The bER measurement is for evaluating the error rate of the data. In the first step, a mark train containing patterns of 2 T to 9 T at random was over-written 10 times in a prescribed track. Then, the same random patterns were overwritten 10 times in the adjacent tracks on both sides of the track in question. Further, the bER value was measured on the track in question.

(2) Analog Measurement

The analog measurement is for evaluating the quality of the read signal. In the first step, a mark train containing patterns of 2 T to 9 T at random was overwritten 10 times. Then, a single pattern of 9 T was overwritten once on the mark train, followed by measuring the carrier-to-noise ratio (CNR) of the signal frequency of the 9 T mark by a spectrum analyzer. Further, the recording marks were irradiated with a laser beam of an erasure power level by one rotation of the disc so as to erase the recording marks. The amount of reduction in the signal intensity of the 9 T mark after the laser beam irradiation was measured. The measured value was defined as an erasure rate (ER). Then, the head was moved to a track that was sufficiently separated from the original position so as to measure the cross-erase (E-X).

(3) Overwriting (OW) Characteristics

After a random signal was overwritten 2,000 times in the same track, the bit error rate (bER) was measured as described above.

(4) Environmental Test

The environmental test is for evaluating the reliability of the phase-change optical recording medium. After the manufactured disc was exposed to an environment having a temperature of 85° C. and a relative humidity of 85% for 300 hours, the bit error rate (bER) was measured as described above.

The worst value among each land (L) and groove (G) for the L0 information layer and the L1 information layer is given as the representative value of each of the measured data. The results were as follows.

The bit error rate (bER) before the environmental test was not higher than $0.9 \times 10^{-5}$ for each of the land and the groove, supporting that a practical error rate was obtained.

Regarding the analog measurement, the CNR value was not lower than 55 dB for each of the land and the groove, the erasure rate was not higher than −31 dB, and the cross-erase was not higher than −0.2 dB, which were excellent results.

The bit error rate (bER) after the environmental test was not higher than $4.1 \times 10^{-5}$ for each of the land and the groove, which was highly satisfactory.

The bit error rate (bER) after the overwriting test was not higher than $1.9 \times 10^{-5}$ for each of the land and the groove, which was highly satisfactory.

EXAMPLES 2 TO 19

As shown in Table 1, various phase-change optical recording media were manufactured by changing the material and the thickness of the noise reduction film, with the other films constructed as in Example 1. Evaluations similar to those in Example 1 were applied to the phase-change optical recording media thus manufactured. Table 2 shows the results.

EXAMPLE 2

A phase-change optical recording medium as shown in FIGURE was manufactured using $Al_2O_3$ for the noise reduction film in the L0 information layer and using a mixture of HfO and $SiO_2$ for the noise reduction film in the L1 information layer. The deposition method was equal to that in Example 1.

EXAMPLE 3

A phase-change optical recording medium as shown in FIGURE was manufactured using $Si_3N_4$ for the noise reduction film in the L0 information layer and using Si—Al—O for the noise reduction film in the L1 information layer. The deposition method was equal to that in Example 1.

EXAMPLE 4

A phase-change optical recording medium as shown in FIGURE was manufactured using $BiF_3$ for the noise reduction film in the L0 information layer and using $LaF_3$ for the noise reduction film in the L1 information layer. Each of the noise reduction films was formed by vacuum evaporation, and the other films were formed by sputtering.

EXAMPLE 5

A phase-change optical recording medium as shown in FIGURE was manufactured using $NdF_3$ for the noise reduction film in the L0 information layer and using $CeF_3$ for the noise reduction film in the L1 information layer. Each of the noise reduction films was formed by vacuum evaporation, and the other films were formed by sputtering.

EXAMPLE 6

A phase-change optical recording medium as shown in FIGURE was manufactured using $DyF_2$ for the noise reduction film in the L0 information layer and using $GdF_3$ for the noise reduction film in the L1 information layer. Each of the noise reduction films was formed by vacuum evaporation, and the other films were formed by sputtering.

EXAMPLE 7

A phase-change optical recording medium as shown in FIGURE was manufactured using $Yb_2O_3$ for the noise reduction film in the L0 information layer and using $HoF_3$ for the noise reduction film in the L1 information layer. The noise reduction film in the L1 information layer alone was formed by vacuum evaporation, and the other films were formed by sputtering.

EXAMPLE 8

A phase-change optical recording medium as shown in FIGURE was manufactured using $NdF_3$ for the noise reduction film in the L0 information layer and using $SrF_2$ for the noise reduction film in the L1 information layer. Each of the noise reduction films was formed by vacuum evaporation, and the other films were formed by sputtering.

EXAMPLE 9

A phase-change optical recording medium as shown in FIGURE was manufactured using $YF_3$ for the noise reduction film in the L0 information layer and using $YbF_3$ for the noise reduction film in the L1 information layer. Each of the noise reduction films was formed by vacuum evaporation, and the other films were formed by sputtering.

EXAMPLE 10

A phase-change optical recording medium as shown in FIGURE was manufactured using a mixture of $La_2O_3$ and $MgF_2$ for the noise reduction film in the L0 information layer and using $MgO_2$ for the noise reduction film in the L1 information layer. Each of the noise reduction films was formed by vacuum evaporation, and the other films were formed by sputtering.

EXAMPLE 11

A phase-change optical recording medium as shown in FIGURE was manufactured using $BaF_2$ for the noise reduction film in the L0 information layer and using a mixture of AlN and $CaF_2$ for the noise reduction film in the L1 information layer. The noise reduction film in the L0 information layer alone was formed by vacuum evaporation, and the other films were formed by sputtering.

EXAMPLE 12

A phase-change optical recording medium as shown in FIGURE was manufactured using a mixture of $Y_2O_3$ and NaF for the noise reduction film in the L0 information layer and using a mixture of $Bi_2O_3$ and LiF for the noise reduction film in the L1 information layer.

EXAMPLE 13

A phase-change optical recording medium as shown in FIGURE was manufactured using a mixture of $Gd_2O_3$ and $CeF_3$ for the noise reduction film in the L0 information layer and using a mixture of $CeO_2$ and $AlF_3$ for the noise reduction film in the L1 information layer.

EXAMPLE 14

A phase-change optical recording medium as shown in FIGURE was manufactured using a mixture of $Ho_2O_3$ and $Na_3AlF_6$ for the noise reduction film in the L0 information layer and using a mixture of $In_2O_3$ and $Na_5Al_3F_{14}$ for the noise reduction film in the L1 information layer.

EXAMPLE 15

A phase-change optical recording medium as shown in FIGURE was manufactured using a mixture of $SnO_2$ and $MgF_2$ for the noise reduction film in the L0 information layer and using a mixture of $Pr_6O_{11}$ and $CaF_2$ for the noise reduction film in the L1 information layer.

EXAMPLE 16

A phase-change optical recording medium as shown in FIGURE was manufactured using a mixture of $Sc_2O_3$ and $SiO_2$ for the noise reduction film in the L0 information layer and using a mixture of ZnO and LiF for the noise reduction film in the L1 information layer.

EXAMPLE 17

A phase-change optical recording medium as shown in FIGURE was manufactured using a mixture of $V_2O_5$ and $CeF_3$ for the noise reduction film in the L0 information layer and using a mixture of $Nd_2O_3$ and $SiO_2$ for the noise reduction film in the L1 information layer.

EXAMPLE 18

A phase-change optical recording medium was manufactured using SiOC for the noise reduction film in the L0 information layer and without forming a noise reduction film in the L1 information layer.

EXAMPLE 19

A phase-change optical recording medium was manufactured using $SiO_2$ for the noise reduction film in the L1 information layer and without forming a noise reduction film in the L0 information layer.

COMPARATIVE EXAMPLES 1 TO 6

As shown in Table 1, various phase-change optical recording media were manufactured by changing the material and the thickness of the noise reduction film, with the other films constructed as in Example 1. The thickness of any one of the noise reduction films in the L0 information layer and the noise reduction film in the L1 information layer was set smaller than 20 nm and the thickness of the other noise reduction film was set larger than 120 nm. Evaluations similar to those in Example 1 were applied to the phase-change optical recording media thus manufactured. Table 2 shows the results.

COMPARATIVE EXAMPLE 1

A phase-change optical recording medium was manufactured without forming a noise reduction film in any of the L0 information layer and the L1 information layer.

COMPARATIVE EXAMPLE 2

A phase-change optical recording medium was manufactured using a $SiO_2$ film having a thickness of 15 nm as the noise reduction film in the L0 information layer and using a $Si_3N_4$ film having a thickness of 130 nm as the noise reduction film in the L1 information layer.

COMPARATIVE EXAMPLE 3

A phase-change optical recording medium was manufactured using an $MgO_2$ film having a thickness of 135 nm as the noise reduction film in the L0 information layer and using a $Yb_2O_3$ film having a thickness of 10 nm as the noise reduction film in the L1 information layer.

COMPARATIVE EXAMPLE 4

A phase-change optical recording medium was manufactured using a SiOC film having a thickness of 10 nm as the noise reduction film in the L0 information layer and using a $SiO_2$ film having a thickness of 140 nm as the noise reduction film in the L1 information layer.

COMPARATIVE EXAMPLE 5

A phase-change optical recording medium was manufactured using a SiC film having a thickness of 19 nm as the noise reduction film in the L0 information layer and using a $Ta_2O_5$ film having a thickness of 130 nm as the noise reduction film in the L1 information layer.

COMPARATIVE EXAMPLE 6

A phase-change optical recording medium was manufactured using a $TiO_2$ film having a thickness of 125 nm as the noise reduction film in the L0 information layer and using a SiC film having a thickness of 18 nm as the noise reduction film in the L1 information layer.

As is apparent from Table 2, satisfactory experimental data were obtained from the phase-change optical recording media for Examples 1 to 19. Specifically, the CNR values before the environmental test were 53 to 55 dB, the bER values before the environmental test were 0.9 to $1.6 \times 10^{-5}$, the bER values after the environmental test were 4.0 to $4.6 \times 10^{-5}$, and the bER values after the overwriting test were 1.9 to $2.8 \times 10^{-5}$.

In contrast, in the phase-change optical recording media for Comparative Examples 1 to 6, the CNR values before the environmental test were 45 to 51 dB, which were inferior to the values for Examples 1 to 19. Also, the bER values before the environmental test for Comparative Examples were 4.4 to $8.7 \times 10^{-4}$, which indicates that it would be very difficult to correct the errors. The experimental data clearly indicated that satisfactory results would not be obtained even if the environmental test and the overwriting test were conducted. Such being the situation, the environmental test and the overwriting test were not conducted.

TABLE 1

| No. | Noise reduction layer in L0 | t [nm] | Noise reduction layer in L1 | t [nm] |
|---|---|---|---|---|
| Example 1 | SiOC | 60 | SiO2 | 90 |
| 2 | Al2O3 | 40 | HfO2 + SiO2 | 120 |
| 3 | Si3N4 | 55 | Si—Al—O | 50 |
| 4 | BiF3 | 30 | LaF3 | 80 |
| 5 | NdF3 | 85 | CeF3 | 25 |
| 6 | DyF2 | 90 | GdF3 | 60 |
| 7 | Yb2O3 | 120 | HoF3 | 40 |
| 8 | NdF3 | 50 | SrF2 | 55 |
| 9 | YF3 | 80 | YbF3 | 30 |
| 10 | La2O3 + MgF2 | 25 | MgO2 | 85 |
| 11 | BaF2 | 60 | AlN + CaF2 | 45 |
| 12 | Y2O3 + NaF | 40 | Bi2O3 + LiF | 50 |
| 13 | Gd2O3 + CeF3 | 55 | CeO2 + AlF3 | 80 |
| 14 | Ho2O3 + Na3AlF6 | 30 | In2O3 + Na5Al3F14 | 25 |
| 15 | SnO2 + MgF2 | 85 | Pr6O11 + CaF2 | 60 |
| 16 | Sc2O3 + SiO2 | 45 | ZnO + LiF | 40 |
| 17 | V2O5 + CeF3 | 35 | Nd2O3 + SiO2 | 70 |
| 18 | SiOC | 30 | None | — |
| 19 | None | — | SiO2 | 60 |
| Comparative Example 1 | None | — | None | — |
| 2 | SiO2 | 15 | Si3N4 | 130 |
| 3 | MgO2 | 135 | Yb2O3 | 10 |
| 4 | SiOC | 10 | SiO2 | 140 |
| 5 | SiC | 19 | Ta2O5 | 130 |
| 6 | TiO2 | 125 | SiC | 18 |

TABLE 2

| No. | Before environmental test CNR[dB] | Before environmental test bER | After environmental test bER | After OW test bER |
|---|---|---|---|---|
| Example 1 | 55 | $0.9 \times 10^{-5}$ | $4.0 \times 10^{-5}$ | $1.9 \times 10^{-5}$ |
| 2 | 54 | $1.2 \times 10^{-5}$ | $4.0 \times 10^{-5}$ | $2.0 \times 10^{-5}$ |
| 3 | 53 | $1.1 \times 10^{-5}$ | $4.2 \times 10^{-5}$ | $2.1 \times 10^{-5}$ |
| 4 | 53 | $1.2 \times 10^{-5}$ | $4.1 \times 10^{-5}$ | $2.2 \times 10^{-5}$ |
| 5 | 53 | $1.2 \times 10^{-5}$ | $4.3 \times 10^{-5}$ | $2.1 \times 10^{-5}$ |
| 6 | 53 | $1.3 \times 10^{-5}$ | $4.3 \times 10^{-5}$ | $2.3 \times 10^{-5}$ |
| 7 | 53 | $1.4 \times 10^{-5}$ | $4.4 \times 10^{-5}$ | $2.2 \times 10^{-5}$ |
| 8 | 53 | $1.4 \times 10^{-5}$ | $4.4 \times 10^{-5}$ | $2.6 \times 10^{-5}$ |
| 9 | 53 | $1.3 \times 10^{-5}$ | $4.5 \times 10^{-5}$ | $2.6 \times 10^{-5}$ |
| 10 | 53 | $1.5 \times 10^{-5}$ | $4.4 \times 10^{-5}$ | $2.5 \times 10^{-5}$ |
| 11 | 53 | $1.4 \times 10^{-5}$ | $4.3 \times 10^{-5}$ | $2.7 \times 10^{-5}$ |
| 12 | 53 | $1.4 \times 10^{-5}$ | $4.4 \times 10^{-5}$ | $2.2 \times 10^{-5}$ |
| 13 | 53 | $1.3 \times 10^{-5}$ | $4.3 \times 10^{-5}$ | $2.3 \times 10^{-5}$ |
| 14 | 53 | $1.4 \times 10^{-5}$ | $4.3 \times 10^{-5}$ | $2.7 \times 10^{-5}$ |
| 15 | 53 | $1.4 \times 10^{-5}$ | $4.4 \times 10^{-5}$ | $2.2 \times 10^{-5}$ |
| 16 | 53 | $1.3 \times 10^{-5}$ | $4.3 \times 10^{-5}$ | $2.3 \times 10^{-5}$ |
| 17 | 53 | $1.5 \times 10^{-5}$ | $4.4 \times 10^{-5}$ | $2.5 \times 10^{-5}$ |
| 18 | 54 | $1.6 \times 10^{-5}$ | $4.6 \times 10^{-5}$ | $2.7 \times 10^{-5}$ |
| 19 | 53 | $1.6 \times 10^{-5}$ | $4.5 \times 10^{-5}$ | $2.8 \times 10^{-5}$ |
| Comparative Example 1 | 51 | $4.4 \times 10^{-4}$ | — | — |
| 2 | 45 | $4.9 \times 10^{-4}$ | — | — |
| 3 | 48 | $4.8 \times 10^{-4}$ | — | — |
| 4 | 51 | $4.4 \times 10^{-4}$ | — | — |
| 5 | 47 | $7.6 \times 10^{-4}$ | — | — |
| 6 | 46 | $8.7 \times 10^{-4}$ | — | — |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A phase-change optical recording medium, comprising:
a first information layer arranged in a position close to a light incident side and including a lower dielectric film, a phase-change optical recording film, an upper dielectric film, a semitransparent reflective film and a protective film viewed from the light incident side;
a second information layer arranged in a position remote from the light incident side and including another lower dielectric film, another phase-change optical recording film, another upper dielectric film and a total reflective film viewed form the light incident side; and
an interlayer separating film arranged between the first information layer and the second information layer, wherein
at least one of the first information layer and the second information layer comprises a noise reduction film, the noise reduction film in the first information layer being arranged between the protective film and the interlayer separating film and in contact with the interlayer separating film, the noise reduction film in the second information layer being arranged between the another lower dielectric film and the interlayer separating film and in contact with the interlayer separating film, and
the noise reduction film comprising at least one material selected from the group consisting of $SiO_x$ ($1 \leq x \leq 2$), SiOC, $MgO_x$ ($1 \leq x \leq 2$), $Al_2O_3$, Si—Al—O (mullite), $Yb_2O_3$, $Si_3N_4$, $BaF_2$, $BiF_3$, $CeF_3$, $LaF_3$, $NdF_3$, $PbF_2$, $DyF_2$, $GdF_3$, $HoF_3$, $NdF_3$, $SrF_2$, $ThF_4$, $YbF_3$, $YF_3$, $AlF_3$, $CaF_2$, $MgF_2$, NaF, $Na_3AlF_6$, $Na_5Al_3F_{14}$, LiF, $ThO_2$, $La_2O_3$, $Gd_2O_3$, $Bi_2O_3$, $HfO_2$, $Nd_2O_3$, $Sb_2O_3$, $Sc_2O_3$, $V_2O_5$, $Y_2O_3$, AlN, $CeO_2$, $Ho_2O_3$, $In_2O_3$, $SnO_2$, $Pr_6O_{11}$ and ZnO, and wherein
if the first information layer comprises the noise reduction film, the protective film is formed of $ZnS:SiO_2$, and if the second information layer comprises the noise reduction film, the another lower dielectric film is formed of $ZnS:SiO_2$.

2. The phase-change optical recording medium according to claim 1, wherein both of the first information layer and the second information layer comprise the noise reduction film.

3. The phase-change optical recording medium according to claim 1, wherein the noise reduction film is formed of $SiO_x$ ($1 \leq x \leq 2$) or SiOC.

4. The phase-change optical recording medium according to claim 1, wherein the noise reduction film satisfies the conditions of $1.4 \leq n \leq 1.8$, $0 \leq k \leq 0.001$, and 20 nm $\leq d \leq$ 120 nm, where n and k are for n-ik representing the complex refractive index of the noise reduction film and d denotes the thickness of the noise reduction film.

5. The phase-change optical recording medium according to claim 1, wherein the recording film is represented by the general formula:

$$Ge_xSb_yTe_z,$$

where $x+y+z=100$, and wherein the recording film has a composition within a range defined by x=55, z=45; x=45, z=55; x=10, y=28, z=42; and x=10, y=36, z=54 on the ternary phase diagram of GeSbTe.

6. The phase-change optical recording medium according to claim 5, wherein Bi and/or Sn is substituted for a part of the constituent elements of the recording film, and wherein the recording film has a composition represented by the general formula:

$(Ge_{(1-w)}Sb_w)_x(Sb_{(1-v)}Bi_v)_yTe_z$, where $x+y+z=100$, $0 \leq w < 0.5$ and $0 \leq v < 1.0$.

7. The phase-change optical recording medium according to claim 1, wherein the recording film is represented by the general formula:

$Ge_xBi_yTe_z$, where $x+y+z=100$, and wherein the recording film has a composition within a range defined by $x=55$, $z=45$; $x=45$, $z=55$; $x=10$, $y=28$, $z=42$; and $x=10$, $y=36$, $z=54$ on the ternary phase diagram of GeBiTe.

8. The phase-change optical recording medium according to claim 1, wherein the fist information layer and the second information layer comprise an interface film at least one position of between the lower dielectric film and the phase-change optical recording film and between the phase-change optical recording film and the upper dielectric film.

9. The phase-change optical recording medium according to claim 8, wherein the interface film is selected from the group consisting of HfO2, GeN, Si—C and Si—N.

* * * * *